Nov. 28, 1950  G. F. DIBERT ET AL  2,532,151
STEERING MECHANISM FOR TRAILERS
Filed July 18, 1949  3 Sheets-Sheet 1
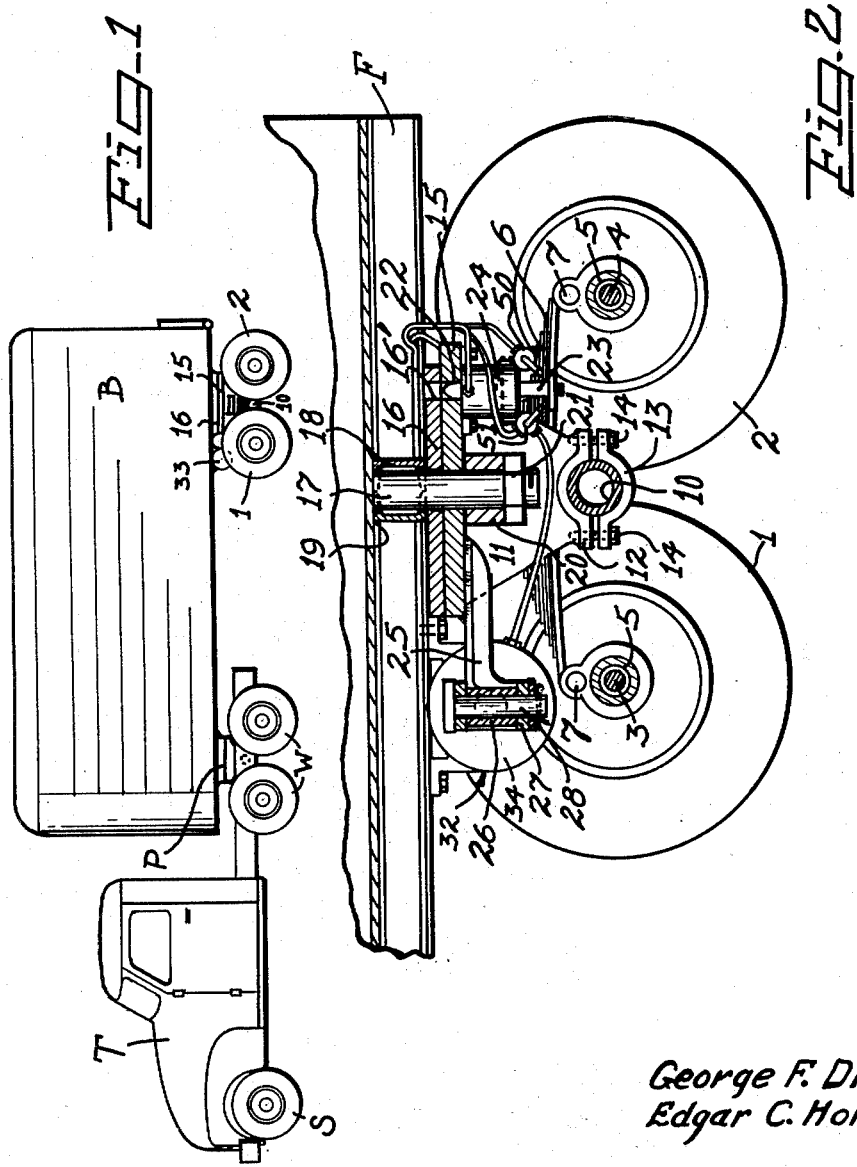
George F. Dibert
Edgar C. Holst
Inventors
By Glenn L. Fish
Attorney

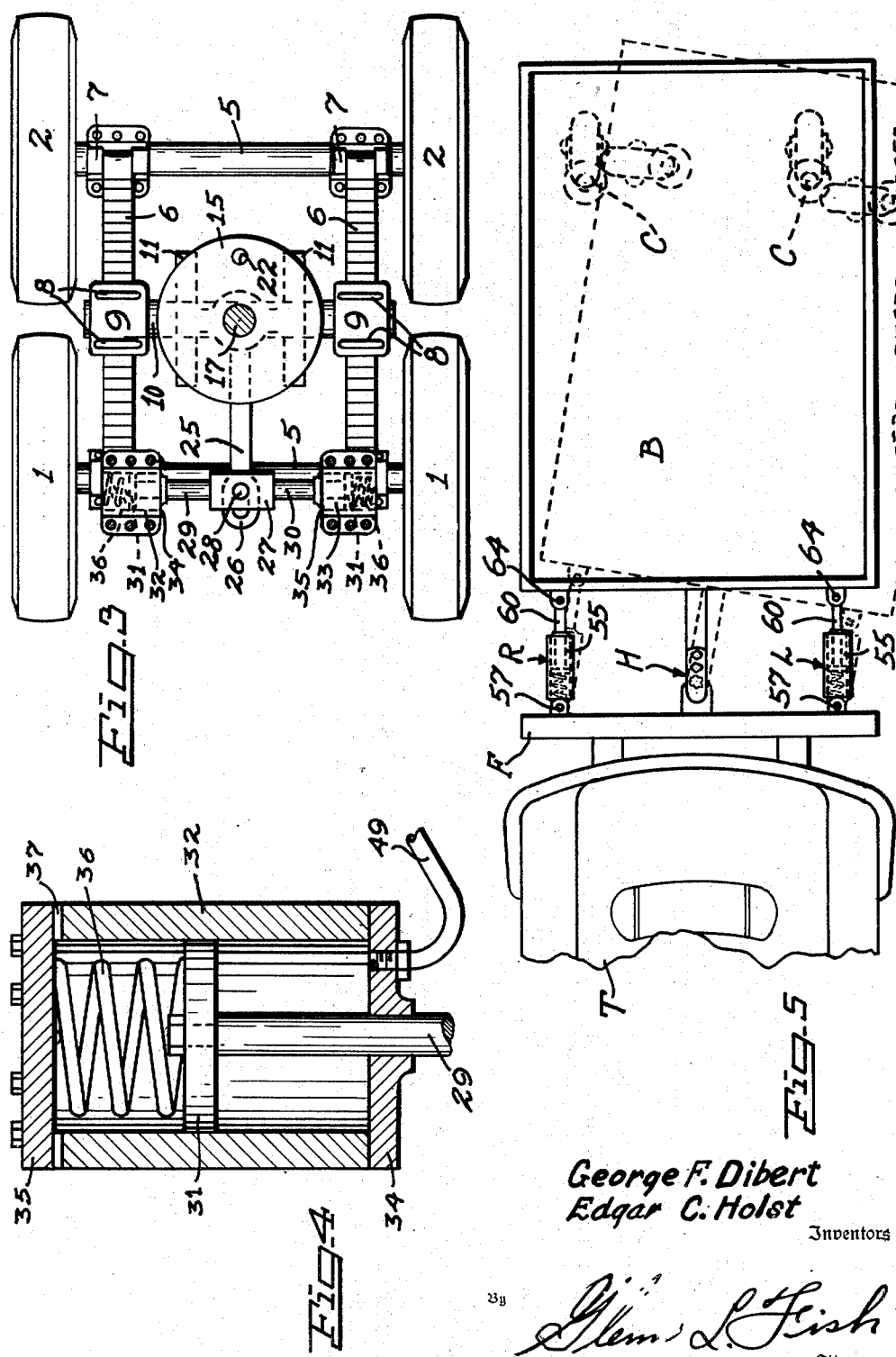

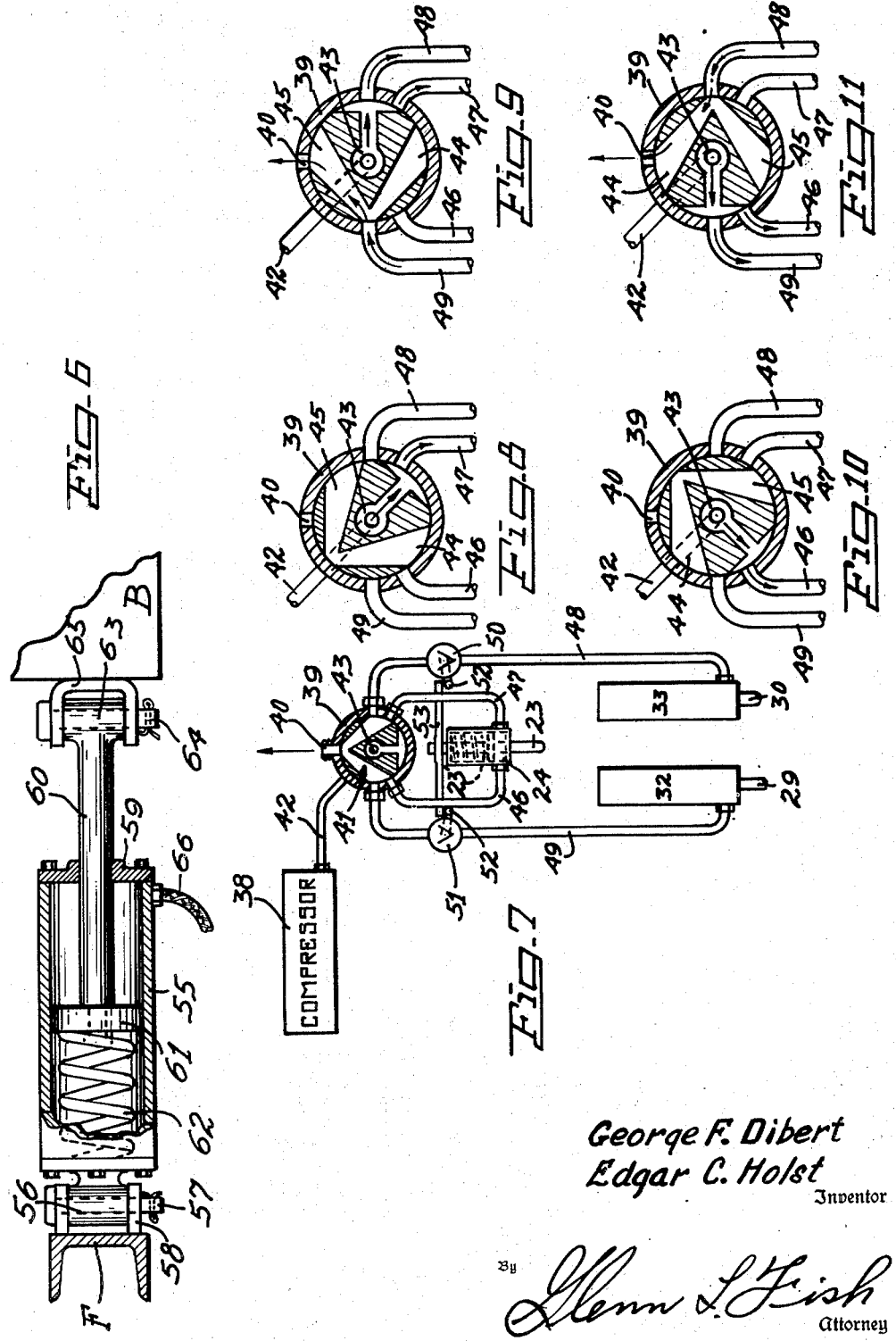

Patented Nov. 28, 1950

2,532,151

UNITED STATES PATENT OFFICE 2,532,151

STEERING MECHANISM FOR TRAILERS

George F. Dibert and Edgar C. Holst, Spokane, Wash.

Application July 18, 1949, Serial No. 105,408

7 Claims. (Cl. 280—33.5)

The present invention relates to the general class of wheeled and articulated motor operated land vehicles, or vehicle trains, of the type employing a tractor truck and a trailing van, and more specifically to steering mechanism for trailers or tandem trucks, by means of which the articulated vehicles may readily be steered when turning around sharp curves or acute corners, and the auxiliary steering mechanism is especially desirable and effective in backing and maneuvering a tractor truck, or an articulated train, when parking for loading or unloading purposes. The motor operated front tractor or towing vehicle is equipped with usual steering mechanism and operating means, and the trailer or body of the tandem truck is equipped with auxiliary pressure operated and swiveled running gear that is controlled by a fluid pressure master valve and system including servo-motors for right and left turns. Resilient means are utilized for restoring the running gear to straight-away position; resilient means are employed for locking the running gear; and fluid pressure operated means are employed for unlocking the running gear.

The invention embodies a combination of parts that may be manufactured with facility and low cost of production, and the parts may be assembled with convenience to insure a quick-acting and reliable steering equipment for trailers that may be installed with a minimum expenditure of time and labor, and manually controlled with ease by the driver or operator of the motor operated vehicle.

In the accompanying drawings two complete examples of physical embodiments of the invention are illustrated wherein the parts are combined in accord with modes so far devised for the practical application of the principles of the invention. It will however be understood that changes and alterations are contemplated and may be made in these exemplifying drawings and mechanical structures, within the scope of the appended claims, without departing from the principles of the invention.

Figure 1 is a side elevation of a tandem truck equipped with one embodiment of the invention; and Figure 2 is an enlarged vertical longitudinal sectional view at the rear end of a trailer equipped with a swiveled four-wheel truck of the invention.

Figure 3 is a top plan view of the steering truck of Fig. 2.

Figure 4 is an enlarged longitudinal sectional view of one of the fluid pressure operated servo-motors.

Figure 5 is a plan view showing portions of a towing vehicle and trailer equipped with another form of the invention; and Figure 6 is an enlarged longitudinal sectional view of one of the coupling-steering motors of Fig. 5.

Figure 7 is a diagram of the fluid pressure operating system showing the manually controlled master valve in section, with the valve in position for straight-away travel of the running gear.

Figures 8 and 9 disclose the two positions for unlocking the swivel truck and making a left turn.

Figures 10 and 11 disclose the master valve in the two positions for unlocking the swivel truck and for making a right turn.

In order that the arrangement and utility of parts may readily be understood a tandem truck is shown in Fig. 1 including a six-wheel tractor or motor operated vehicle T, having the usual front steering wheels S and operating means, and the four drive wheels W; the rear end of the tractor being coupled by a swivel joint P to the front end of the trailer or body B of the articulated vehicle.

The body B of the trailer is equipped with usual longitudinal and transverse beams forming the frame or chassis F, and the four wheel steering truck, which supports the rear end of the body is equipped with two pairs of wheels 1, 1, and 2, 2, having a front axle 3 and a rear axle 4 each mounted in a transversely arranged tubular housing 5. These front and rear housings are united, resiliently, by a pair of longitudinally extending leaf springs 6, 6, the opposite ends of which are pivotally supported at 7 on the two axle housings; and these suspension springs are mounted by U-bolts 8 and bearing blocks 9 upon a transverse tubular beam or bolster 10 intermediate of and parallel with the axle housings, and disposed in a horizontal plane slightly above the plane of the axle housings.

The bolster 10 is equipped with two laterally spaced vertically arranged and longitudinally extending side plates 11, 11, mounted by clamp caps 12, complementary cross plates 13, and bolts 14, on the bolster. These side plates are integral with and depend from a circular swivel head, steering head, or fifth wheel 15 located under and supporting a complementary bearing plate 16 that may be welded or otherwise rigidly secured to the frame F of the trailer.

For locking the truck in position for straight-away travel the swiveled steering head and the complementary bearing plate or bed plate are drilled to form locking bores or holes, and the centers of the steering head and bearing plate are provided with bearing bores for a king-bolt or spindle 17, the upper end of which is fixedly mounted in a sleeve 18 that is welded at 19 or otherwise secured to the trailer frame F. The lower protruding end of the king bolt or fixed swivel pin is provided with a bearing washer 20, and a retaining nut 21 is threaded on the end of the king pin to secure the swivel joint.

For locking the steering head and the bearing plate against relative movement and thus maintaining the four-wheel steering truck in position for straight-away travel and longitudinal alinement with the tractor, the bearing head has a bore or socket 16' and the swivel head or steering head has a complementary bore 22 for registration therewith.

A vertically arranged locking bolt 23 fitted in the bore of the steering head projects through the registering socket 16 for rigidly locking together these parts. The bolt is projected to locked position under action of a spring 23' located in the cylinder 24 of a servo-motor that is rigidly attached to the under side of the swivel head.

When the steering truck is to be turned to the right or to the left, the locked bolt is retracted against the tension of spring 23' under fluid pressure supplied to the cylinder of the lock-releasing servo-motor and then, under fluid pressure, a swivel movement is applied to the swivel head through a forwardly projecting radial arm 25 welded to the under side of the swivel head. The free outer end of this radial arm is fashioned with an upright and slotted bearing head 26 that projects through a central coupling housing 27 and a coupling pin 28 links the arm to the housing.

The coupling housing 27 is integral with and it unites two rods or sections 29 and 30 of a cross bar which at its opposite ends forms rods for pistons 31, 31, reciprocable in cylinders 32 and 33 bolted at the underside of the frame F.

These cylinders with their pistons and rods form servo-motors operating under fluid pressure similar to the lock-releasing servo-motor 24, and the cylinders are equipped with end heads 34 and 35, and an inner spring 36 between the piston and the outer head of the piston. Each cylinder is provided with a breather port 37, and the opposed springs 36 in the absence of fluid pressure, serve to center the arm 25, and the swivel head with the bearing plate.

In Fig. 3 if the trailer is to make a right turn fluid pressure is fed to the servo motor 24 for unlocking the swivel head from the bearing plate and fluid pressure is applied to the servo-motor 32 to swing arm 25 to the left. If the trailer is to make a left turn the servo-motor 24 is activated to unlock the steering head and the servo-motor 33 is activated to push arm 25 to the right; and in both turns the degree of swivel movement is determined by the application of fluid pressure in the selected motors.

The fluid pressure system for operating the servo-motors is shown in Fig. 7, as including an air compressor 38 located at a convenient station, and a valve casing 39 having an exhaust port 40, and a manually operated rotary three-way valve 41 located in position for ready access of the driver or operator of the tractor.

Air under pressure is supplied to the valve casing through pipe 42 from the compressor directly to an axial duct 43 of the valve, and the valve is provided with angularly arranged and communicating tangential ducts 44 and 45, merging to distribute the fluid pressure as the valve is turned.

In Figure 7 where the auxiliary steering mechanism or running gear is inactive, air pressure is exhausted from the system through the port 40, and the servo-motor 24 for unlocking the swivel head is exhausted through pipes 46 and 47 to the valve casing; servo-motor 33 is exhausted through pipe 48 and servo-motor 32 is exhausted through pipe 49 to the valve casing.

Pipe 49 is equipped with an automatically operated left turn valve 50, and pipe 48 is equipped with a complementary right turn valve 51, and each of these valves is equipped with an actuating arm 52, operable by the opposite ends of an operating bar or rod 53 that is rigidly and centrally mounted on the locking bolt 23.

To make a left turn of the trailer, the master valve is first turned to position of Fig. 8 to supply air under pressure to servo-motor 24 for retracting the locking bolt 23 and a continued movement of the master valve opens the valve to both pipes 47 and 48, the latter to the left turn cylinder 32. The retracting movement of the locking bolt automatically opens control valve 50 to permit application of fluid pressure to the servo-motor 32, and pressure is exhausted through pipe 48. After the turn has been made the master valve is returned to position of Fig. 7, pressure is exhausted from the branch pipes and servo-motors; the centering springs 36 in coaction with arm 25 centers the swivel head to register the two bores 21—22, and spring 23' projects the bolt to locked position of the swivel joint.

For a right hand turn of the trailer, the master valve is initially turned to position of Fig. 10 to unlock the swivel head, and then to position of Fig. 11 to supply pressure to the two servo-motors 24 and 33; pressure is thus applied through pipes 46 and 48, and exhausted through pipes 47 and 49, and thereafter the steering truck is righted and retained in straight-away position.

In the modified form of the invention in Figs. 5 and 6 where the trailer body B is supported by two usual caster wheels C, C, the trailer is centrally hitched or coupled to the towing vehicle or tractor T by means of a ball and socket coupling or hitch H.

In addition to the central hitch a right turn fluid pressure or hydraulic coupling R, and a left turn coupling L are employed laterally of the central hitch.

Each of these steering couplings, as indicated in Fig. 6, forms a servomotor operated under fluid pressure, that includes a cylinder 55, one end of which is closed by a front swivel and flanged head 56 that is coupled by pin 57 to a pair of vertically spaced bearing ears 58 that are welded or otherwise secured on the rear face of a channel frame member F of tractor or towing vehicle.

The rear end of the cylinder is closed by a head 59 in which a piston rod 60 has a slide bearing, and a piston 61 on the rod within the cylinder is held under tension by spring 62. The rear end of the piston rod is equipped with a swivel head 63 that is retained by the coupling bolt 64 within a yoke 65 rigid with the body frame B, and hydraulic pressure is applied within the cylinder through pipe 66. The two servo-coupling-motors R and L receive fluid pressure from a hydraulic system that is controlled by a master valve; for a left turn fluid pressure is applied to the piston of the L coupling to swing the trailer body B to the position of dotted lines in Fig. 5; and for a right turn the master valve is shifted to admit hydraulic pressure to the R servo-coupling-motor.

Having thus fully described the invention, what is claimed and desired to be secured by Letters Patent is:

1. In fluid pressure operated steering mechanism for articulated motor-operated wheeled vehicles including a towing vehicle and a trailer, the combination with right turn and left turn running gear and servo-motors therefor, of means for locking the running gear in straight-away position a master valve selectively controlling the supply of motive fluid to said servo-motors and locking means, resilient means for securing the locking means, and resilient means within servo-motors for restoring the running gear to straight-away service.

2. In fluid pressure operated steering mechanism for a tractor and its trailer, the combination with right turn and left turn running gear and servo-motors therefor, resiliently secured locking means for the running gear and a servo-motor for unlocking the running gear, of a master valve for selectively controlling the application of motive fluid to each of said servo-motors for turning the trailer, and resilient means within two of the servo-motors for restoring the running gear to straight-away service.

3. In a fluid pressure operated steering mechanism for a trailer having a fixed king pin and bearing plate, the combination with a four-wheel steering truck having a spring suspension and a transverse bolster, of a steering head mounted on the bolster and swiveled on the king pin, detachable means for locking the swiveled head to the bearing plate and fluid pressure means for unlocking the steering head, and fluid pressure operated means for selectively turning the steering head with relation to the bearing plate.

4. In a fluid pressure operated steering truck for a trailer having a fixed king pin and a bearing plate, the combination with a steering head mounted on the truck and swiveled on the king pin against the bearing plate, of a servo-motor having resilient means for locking the swivel head to the bearing plate, a pair of servo-motors having opposed resilient means for centering the swivel head with the bearing plate, and a master valve for selectively controlling flow of motive fluid to two of the servo-motors for releasing the steering head and turning the truck.

5. In a fluid pressure operated steering truck for a trailer having a fixed king pin and bearing plate, the combination with a steering head swiveled on the king pin against the bearing plate, means for locking the steering head to the bearing plate, and means releasing the steering head, of a radially extended arm on the steering head, a pair of transversely arranged and opposed servo-motors fixed to the trailer, a master valve for selectively controlling application of motive fluid to said servo-motors, each said motor having an operative connection to said arm for turning the steering head, and resilient means in each servo-motor for restoring the arm to straight-away position.

6. In a fluid pressure operated steering truck for a trailer having a fixed king pin and bearing plate, the combination with a steering head swiveled on the king pin against the plate, said head and plate having registering holes, a servo-motor mounted on the head and including a pressure-released locking bolt in said holes and resilient means for projecting the bolt to locked position, of a tiller-arm rigid with the head, a pair of opposed servo-motors on the trailer for selectively turning the tiller-arm, and resilient means within the pair of servo-motors for centering the tiller-arm.

7. In a fluid pressure operated steering truck for a trailer having a fixed kingpin and bearing head, the combination with a steering head swiveled on the king pin against bearing head, locking means for said steering head and bearing head, and means for releasing the locking means, of a tiller-arm rigid with the steering head and a slotted coupling head on the arm, a pair of opposed servo-motors mounted on the trailer each including a piston and a piston rod coupled to the coupling head, and resilient means in the opposed servo-motors for centering said arm.

GEORGE F. DIBERT.
EDGAR C. HOLST.

REFERENCES CITED

The following references are of record in the file of this patent:

UNITED STATES PATENTS

| Number | Name | Date |
|---|---|---|
| 859,235 | Macfarren | July 9, 1907 |
| 1,908,095 | York et al. | May 9, 1933 |
| 2,112,559 | Davidson | Mar. 29, 1938 |
| 2,127,868 | Huffman | Aug. 23, 1938 |
| 2,130,274 | Harrson et al. | Sept. 13, 1938 |
| 2,433,269 | Fellabaum | Dec. 23, 1947 |